US012762255B2

(12) United States Patent
O'Reilly, Jr. et al.

(10) Patent No.: US 12,762,255 B2
(45) Date of Patent: Oct. 13, 2026

(54) PROTECTING WORKFLOW SECURITY BY UP-FRONT AUTHORIZATION AND CAPACITY-SCOPED CRYPTOGRAPHIC SECURITY CONTEXT

(71) Applicant: Dell Products L.P., Round Rock, TX (US)

(72) Inventors: Daniel K. O'Reilly, Jr., Framingham, MA (US); Chooi Peng Low, Plano, TX (US); Yi Fang, Sharon, MA (US); Ranjit Kollu, Norfolk, MA (US); Jonathon Cwik, Chicago, IL (US); Ching-Yun Chao, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 96 days.

(21) Appl. No.: 18/486,317

(22) Filed: Oct. 13, 2023

(65) Prior Publication Data

US 2025/0124145 A1 Apr. 17, 2025

(51) Int. Cl.
*G06F 21/60* (2013.01)
*G06F 21/53* (2013.01)
*G06F 21/54* (2013.01)

(52) U.S. Cl.
CPC ............ *G06F 21/604* (2013.01); *G06F 21/53* (2013.01); *G06F 21/54* (2013.01)

(58) Field of Classification Search
CPC ......... G06F 21/604; G06F 21/53; G06F 21/54
See application file for complete search history.

(56) References Cited

U.S. PATENT DOCUMENTS

| | | | |
|---|---|---|---|
| 8,964,990 | B1 | 2/2015 | Baer et al. |
| 10,891,569 | B1 * | 1/2021 | Werner ............ G06Q 10/06316 |
| 11,334,471 | B1 | 5/2022 | Stocker et al. |
| 11,356,273 | B1 | 6/2022 | Patel et al. |
| 11,818,115 | B1 | 11/2023 | Shah et al. |
| 11,995,467 | B1 | 5/2024 | Goacher et al. |
| 2006/0149698 | A1 | 7/2006 | Haselden et al. |
| 2008/0216147 | A1 | 9/2008 | Duffy |
| 2011/0209159 | A1 * | 8/2011 | Baratz ............... G06F 16/24575 707/E17.112 |
| 2014/0123312 | A1 * | 5/2014 | Marcotte ................ G06F 21/33 726/28 |
| 2016/0182525 | A1 * | 6/2016 | Zhu ......................... H04L 63/20 726/1 |
| 2017/0041296 | A1 | 2/2017 | Ford et al. |

(Continued)

OTHER PUBLICATIONS

Rose et al., Zero Trust Architecture, Aug. 1, 2020, NIST Special Publication, 800-207.

*Primary Examiner* — Trong H Nguyen
(74) *Attorney, Agent, or Firm* — Workman Nydegger

(57) ABSTRACT

Up front authorization of a workflow and a security context for workflow execution are disclosed. All possible authorizations that may be required by a workflow are identified up front. A requestor is allowed to execute the workflow only when the authorizations of the user include the authorizations that may be required by the workflow. A security context is generated and associated with the workflow or an instance thereof. The security context scopes or limits the workflow to at least the type or capacity of work requested, work uniquely identified in the security context, and/or service/workflow/call paths that the request is allowed to be processed through.

12 Claims, 7 Drawing Sheets

(56) References Cited

U.S. PATENT DOCUMENTS

2018/0062918 A1 3/2018 Celikyilmaz et al.
2019/0199705 A1* 6/2019 Zhu ........................ H04L 63/083
2019/0392392 A1 12/2019 Elden et al.
2020/0151630 A1 5/2020 Shakhnovich
2020/0162237 A1 5/2020 Chauhan et al.
2020/0351090 A1* 11/2020 Gardner ................ H04L 9/3247
2020/0409940 A1 12/2020 Gu et al.
2021/0103649 A1* 4/2021 Korus ................. H04L 63/0807
2022/0027806 A1 1/2022 Burman et al.
2022/0070246 A1 3/2022 Ripa
2022/0292167 A1* 9/2022 Vaishnav ................ G06F 21/51
2023/0353575 A1* 11/2023 Chandra ................. H04L 63/08
2024/0370294 A1 11/2024 Kumar et al.
2025/0094590 A1 3/2025 Jabbar et al.
2025/0106221 A1* 3/2025 Wang .................... H04L 63/108
2025/0126125 A1 4/2025 Fang et al.

* cited by examiner

260

```
apiVersion: "v1"
kind: "ConfigMap"
metadata:
  name: "api-key-service-policy"
  labels:
    app: "api-key-service"
data:
  policyjson: |-
    {
      "service" : "api-key-service",
      "resources" : [ {
        "path" : "GET /rest/v1/api-access-keys",
        "permission-set" : [ {
          "permissions" : "e8db385e-88dc-4828-a5e4-345ccc32f249",
          "displayNames" : "Manage All Access Keys",
          "conditions": "Match_Org"
        } ]
      }, {
        "path" : "DELETE /rest/v1/api-access-keys/{id}",
        "permission-set" : [ {
          "permissions" : "e8db385e-88dc-4828-a5e4-345ccc32f249",
          "displayNames" : "Manage All Access Keys"
        } ]
      } ]
    }
```

Figure 2B

```
{
  "iss": "https://sec-gateway-1.abc.com",
  "sub": "1234567890",
  "iat": 1516239022,
  "workcontext": {
    "type": "system-copy",
    "workid": "REQ-01",
    "validpaths": [
      "A,B,C",
      "A,C"
    ]
  },
  "roles": [
    "SystemAdmin"
  ],
  "permissions": [
    "storage:rw",
    "policy:r"
  ]
}
```

360

Figure 3B

PROTECTING WORKFLOW SECURITY BY UP-FRONT AUTHORIZATION AND CAPACITY-SCOPED CRYPTOGRAPHIC SECURITY CONTEXT

The present application is related to application Ser. No. 18/486,713 entitled RENDER HIGH WORKFLOW EXECUTION RELIABILITY USING IMMUTABLE SECURITY CONTEXT and filed the same day as the present application. The present application also relates to application Ser. No. 18/466,907, filed Sep. 14, 2023, and entitled METHODS TO ENSURE TRUST VALIDATION AND INTEGRITY OF WORKFLOW EXECUTION. The foregoing applications are incorporated by reference in their entirety.

FIELD OF THE INVENTION

Embodiments of the present invention generally relate to workflows and workflow security. More particularly, at least some embodiments of the invention relate to systems, hardware, software, computer-readable media, and methods for workflow security using up front authorization and a security context that is bound to the workflow.

BACKGROUND

From a practical perspective, a workflow, once initiated, should run to completion without interruption. However, interruptions such as workflow failure may occur. A workflow may fail for various reasons, such as lack of authorizations (also referred to herein as permissions). Recovering from workflow failure, particularly if manual recovery is required, is costly and difficult.

Part of authorizing a workflow relates to answering the question of whether a requestor (e.g., user, client, application) is permitted to perform an action on a specified resource. This is often referred to as a subject-action-resource check. Subject-action-resource checks are an important aspect of workflow security, but there are still risks. For example, just because a requestor is authorized to perform a certain action on a particular resource does not mean that the requestor should perform that action on that resource. For example, a user that is authorized to decommission a storage system should not actually decommission the storage system when submitting a request to copy data from that storage system to another storage system. In addition, workflow execution can be compromised or subject to security risks when considering, for example, changes in requestor credentials and authorization policy changes.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which:

FIG. 2B discloses aspects of aggregating authorizations from workflow code or other sources associated with executing a workflow;

FIG. 3B discloses aspects of a security context;

DETAILED DESCRIPTION OF SOME EXAMPLE EMBODIMENTS

Embodiments of the present invention generally relate to workflow execution and workflow authorization. More particularly, at least some embodiments of the invention relate to systems, hardware, software, computer-readable media, and methods for ensuring that a requestor is authorized to perform a workflow prior to executing the workflow. Embodiment of the invention further relate to trustable and durable security contexts. A security context, by way of example, may relate to scoping a workflow to specific actions even when, by way of example, a requestor may be authorized to perform other actions. More generally, scoping a workflow with a security context may include placing limits of various kinds on the workflow.

The time required to execute a workflow may be long and indeterminate. This presents an issue because the application programming interface (API) of each service used by the workflow often verifies and determines whether to proceed with a request (work or a job) and because a user's credentials or authorizations may have a limited lifetime. Embodiments of the invention relate to ensuring that the authorizations (e.g., credentials, permissions) of a requestor remain valid and trustworthy throughout the execution of a workflow.

Embodiments of the invention relate to authorizing a requestor up front or prior to initiating the workflow and to providing a security context (e.g., in a form of a token) that scopes or limits actions performed in the context of the workflow regardless of the requestor's authorizations. The security context, for example, may prevent an action from being performed in the context of a workflow that the requestor is otherwise authorized to perform.

A workflow definition may include a hierarchy of child workflow definitions, each with unique authorization requirements. Consequently, the actual workflow execution path May depend on various events, some of which may be unpredictable. When authorizing a workflow, embodiments of the invention may consider all workflow execution scenarios in order to reliably ensure that the requestor is authorized to execute the workflow.

When executing a workflow involves remote devices/applications (services) that may depend on an external third-party identity provider and/or authorization service and for other reasons, embodiments of the invention relate to ensuring the requestor is authorized to perform the workflow and that the workflow or requestor is associated with a security context. Embodiments of the invention ensure that the security context scopes the workflow, has an appropriate lifetime, and is protected against unauthorized use.

Prior to discussing aspects the of the security context, which may scope the operation or execution of a workflow, aspects of ensuring that a workflow is authorized or that the requestor is authorized are discussed.

Figure 1:
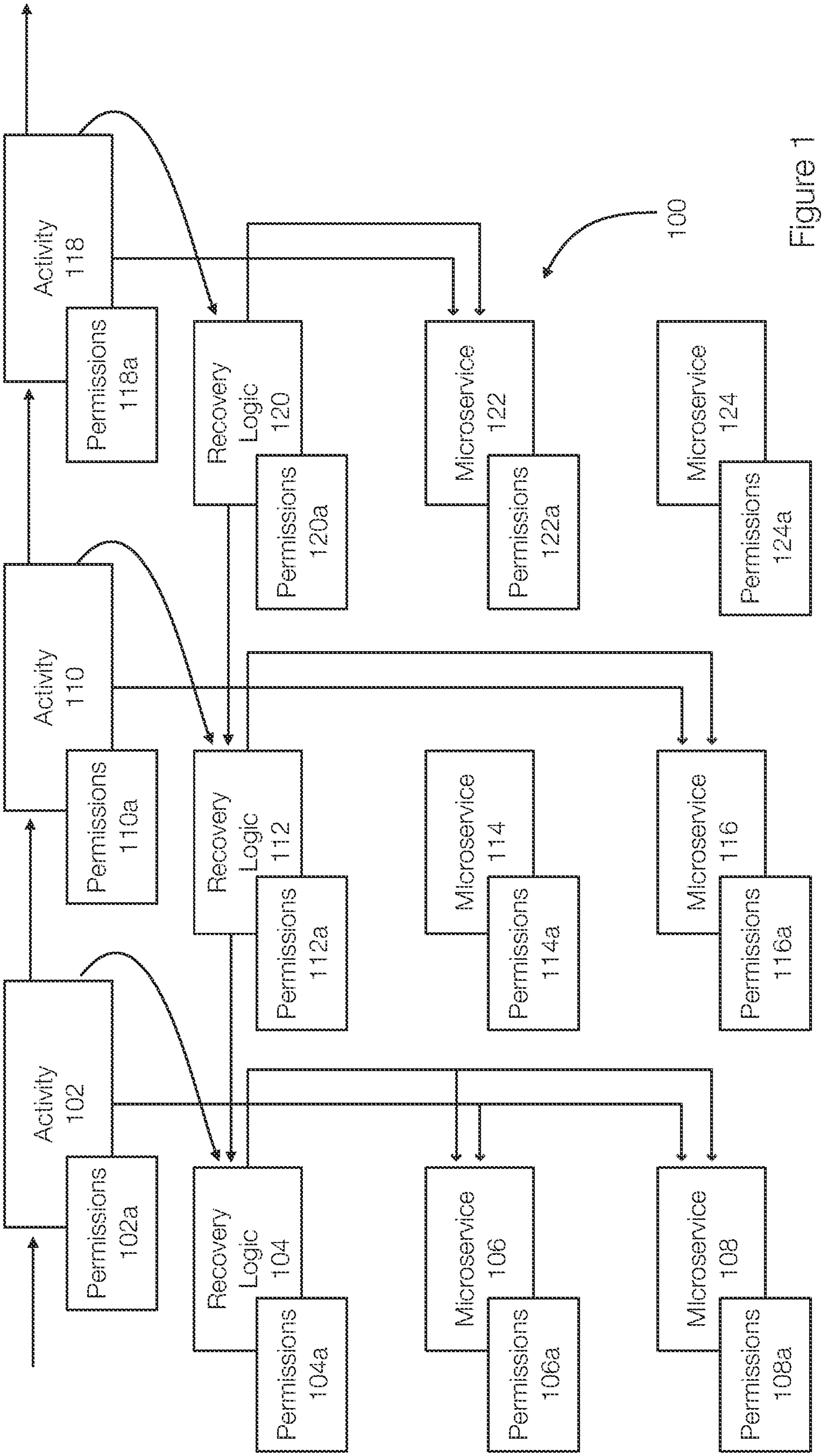
FIG. 1 discloses aspects of an example workflow.

FIG. 1 discloses aspects of a workflow that may be executing or that is planned for execution in a computing environment that may include processors, memory, networks, or the like. The workflow 100 may be performed or executed in one or more different networks or platforms (e.g., an edge network and/or a cloud network). The example workflow 100 (which may represent a portion of a workflow) includes activities 102, 110, and 118. The activities 102, 110, and 118 may represent functions, calls, applications, processes, operations, or the like, of the workflow. The activities 102, 110, and 118 may be or include calls to the APIs of one or more services, such as microservices or other applications or processes.

For example, the activity 102 may include executing a service at a first platform or using the services provided by a first platform. The activities 110 and 118 may include executing or calling services at the same or other platforms.

FIG. 1 illustrates that the activity 102 may be associated with recovery logic 104 and may use or invoke microservices (services) 106 and 108 using their APIs. The activity 110 may be associated with recovery logic 112 and may invoke the microservice 116 (microservice 114 is not required by the workflow 100). The activity 118 may be associated with recovery logic 120 and may invoke the microservice 122 (the microservice 124 is not invoked by the workflow 100).

In this example and as illustrated in FIG. 1, each of the activities, microservices, and recovery logics may be associated with specific authorizations or permissions, represented as permissions 102*a*, 104*a*, 106*a*, 108*a*, 110*a*, 112*a*, 114*a*, 116*a*, 118*a*, 120*a*, 122*a*, and 124*a*.

FIG. 1 further illustrates that the total or maximum authorization requirements (e.g., permissions) required for the workflow are the aggregate of the authorization requirements of all microservices or other services that may be accessed in the course of executing or performing the workflow. For example, the permissions 102*a* is a combination or union of the permissions 106*a* and 108*a*. Thus, if the permissions 106*a* include permissions a, b, and c and the permissions 108*a* include permissions d, e, and f, then the permissions 102*a* for the activity 102 include or may require permissions a, b, c, d, e, and f.

Similarly, if the permissions 114*a* include permissions g and h and the permissions 116*a* include the permissions l, j, and k, then the permissions 110*a* include the permissions l, j, and k. The permissions 114*a* are not included in the permissions 110*a* at least because the microservice 114 is not accessed by the workflow 100. Similarly, the permissions 124*a* (permissions o, p, and q) are not included in the permissions 118*a* (permissions l, m, and n), which are the same as the permissions 122*a*.

The aggregate authorizations required for the workflow 100 thus includes the aggregate of permissions 106*a*, 108*a*, 116*a*, and 122*a*. The authorizations or permissions for the workflow 100 include the aggregate or union of the permissions 102*a*, 110*a*, and 118*a* in this example.

As previously suggested, the exact execution path of a workflow execution is indeterministic. In contrast, the aggregate permissions required by all possible paths a workflow execution may take is deterministic. The authorization requirements of a top-level workflow definition is therefore deterministic and is an aggregate of all authorization requirements of all workflow definitions in the hierarchy of workflows, which may include a top level workflow definition and one or more child workflow definitions.

FIG. 1 illustrates an example where all possible authorizations are determined up front or prior to the execution of the workflow. This allows a work scheduler or job scheduler, which may be configured to evaluate the requestor's authorizations in light of the authorizations that may be required by the workflow execution, to determine whether a requestor has the authorizations needed to execute the workflow even if the actual execution path of the workflow is indeterministic.

Embodiments of the invention relate to evaluating a workflow, its definitions, its code, API code, or the like in order to identify all of the authorizations that may be required. The requestor's authorizations may be evaluated in light of the aggregate authorizations to determine whether the requestor will be able to perform the workflow and avoid failure due to authorization problems.

Figure 2A:
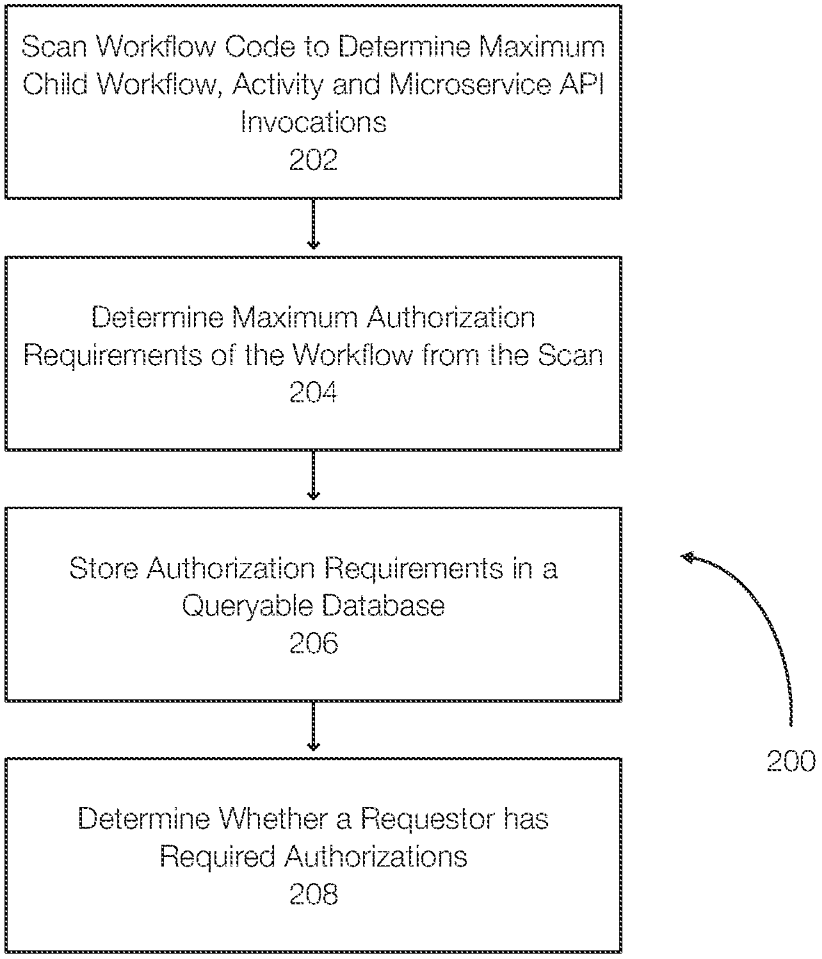
FIG. 2A discloses aspects of determining aggregate permissions associated with a workflow.

FIG. 2A discloses aspects of determining aggregate authorizations associated with a workflow. In the method 200, workflow code (or hierarchy, definitions) or code related to the workflow is scanned 202 to determine or identify the maximum child workflow invocations, activity invocations, and microservice API invocations. This allows the maximal authorization requirements of the workflow to be determined 204 from the scan of the workflow code.

The authorization requirements identified from the scan of the workflow definition are stored 206 in a database. The database can be queried to determine 208 whether a requestor has the required authorizations. For example, a requestor may make a request to execute a workflow. The requestor may be associated with a set of authorizations. The database is queried to determine whether the requestor has the authorizations needed to perform the workflow by comparing the authorizations of the requestor to the authorizations that may be needed to execute the workflow. More specifically, the workflow is authorized only when the requestor has all of the authorizations associated with the workflow. This may allow remedial operations (e.g., granting new authorizations) to be performed prior to executing the workflow to prevent workflow failure due to lack of authorizations. Thus, embodiments of the invention can determine, prior to executing a workflow or when granting authorization to a requestor, whether the authorizations (e.g., roles and/or permissions) of the requestor are sufficient to execute the workload.

FIG. 2B discloses aspects of aggregating authorizations from workflow code or other sources associated with executing a workflow. More specifically, the access control requirements of service APIs may be declared in their access control policies. This allows the source code to be scanned to determine the authorizations required by every service API, by every workflow activity, by every workflow definition, and by every top-level workflow definition. Scanning the source code and storing the access requirements or permissions in a database allows the ability of a requestor to perform a workload to be determined in advance of executing the workload.

FIG. 2B illustrates an example of an access control policy 260. The policy 260 may be scanned to identify the authorizations (e.g., the permissions or permission set) that a requestor needs to use the service. Scanning the access control policies of all APIs identified in the workflow definitions allows the aggregate authorizations or permissions to be identified.

In addition to determining authorization requirements, embodiments of the invention also provide or generate a security context that may be provided to each service API. The security context allows each service to determine, on its own, whether to proceed with a request. The security context may include security credentials, which may have a limited lifetime. When executing a workflow, the security context may scope the actions allowed in the workflow, even when issued by a third party identity provider.

In one example, embodiments of the invention associate the ability to determine the ability of a requestor to perform a workload in advance with a capacity-scoped security context, referred to herein as a security context. Generally, access to resources is achieved using data that is verifiable (e.g., cryptographically verifiable) and that represents access authorization. A JWT (JSON (Javascript Object Notation) Web Token) access token is an example of an access token that may be used in token-based authentication. The access token may allow, for example, an application to access the API of a service. The access token informs the target service that the bearer of the token (i.e., the application) is authorized to access the API of the service and perform actions using the service.

Generally, access tokens have a validity period and the access token becomes invalid when the validity period expires. Because it is impractical for a user to constantly interact with a token issuer (e.g., an authorization server), a separate credential artifact or a refresh token is used to refresh the access token without user interaction. This also allows the authorization server to shorten the lifetime of the access token for security purposes.

However, access tokens are still associated with some risk. For example, there is a security risk if the access token is kept alive longer than needed. This may allow the access token to be stolen and used maliciously. Another problem occurs if the access token needed to access the API of a service lapses while the application is still working on a request. In addition, a problem may arise if access to the access token is not controlled. Thus, only legitimate services working on behalf of the user's request should be allowed access to the access token.

The security provided by access tokens can be improved by embodiments of the invention. More specifically, embodiments of the invention relate to a security context. In one example, a security context is a token includes or represents a combination of an access token and a capacity-scoped security context. However, the security context may be a separate token from the access token.

The security context scopes the ability to perform actions within the workflow. For example, the security context may prevent a requestor from accessing a particular service or a particular method of the service (or the service itself) or from performing certain actions on specified resources even though the requestor may otherwise be authorized to access that particular method or perform those actions. In other words, just because a requestor is authorized to access a specific service or perform a certain action on a particular resource is distinct from whether the requestor is allowed to perform the same action within the context of the work that has been requested. The security context scopes activities in the workflow to ensure that the activities performed or authorized in the context of the workflow.

More specifically, the security context may scope a request and allows each service API to decide whether to proceed with the request. The security context may be cryptographically verifiable and include information for a typical subject-action-resource permission decisions. In addition, and by way of example only, the security context may scope the type or capacity of work requested, is valid only to the work uniquely identified (e.g., the work ID), and may identify the service/workflow/call paths that the request or workflow is allowed to follow.

Figure 3A:
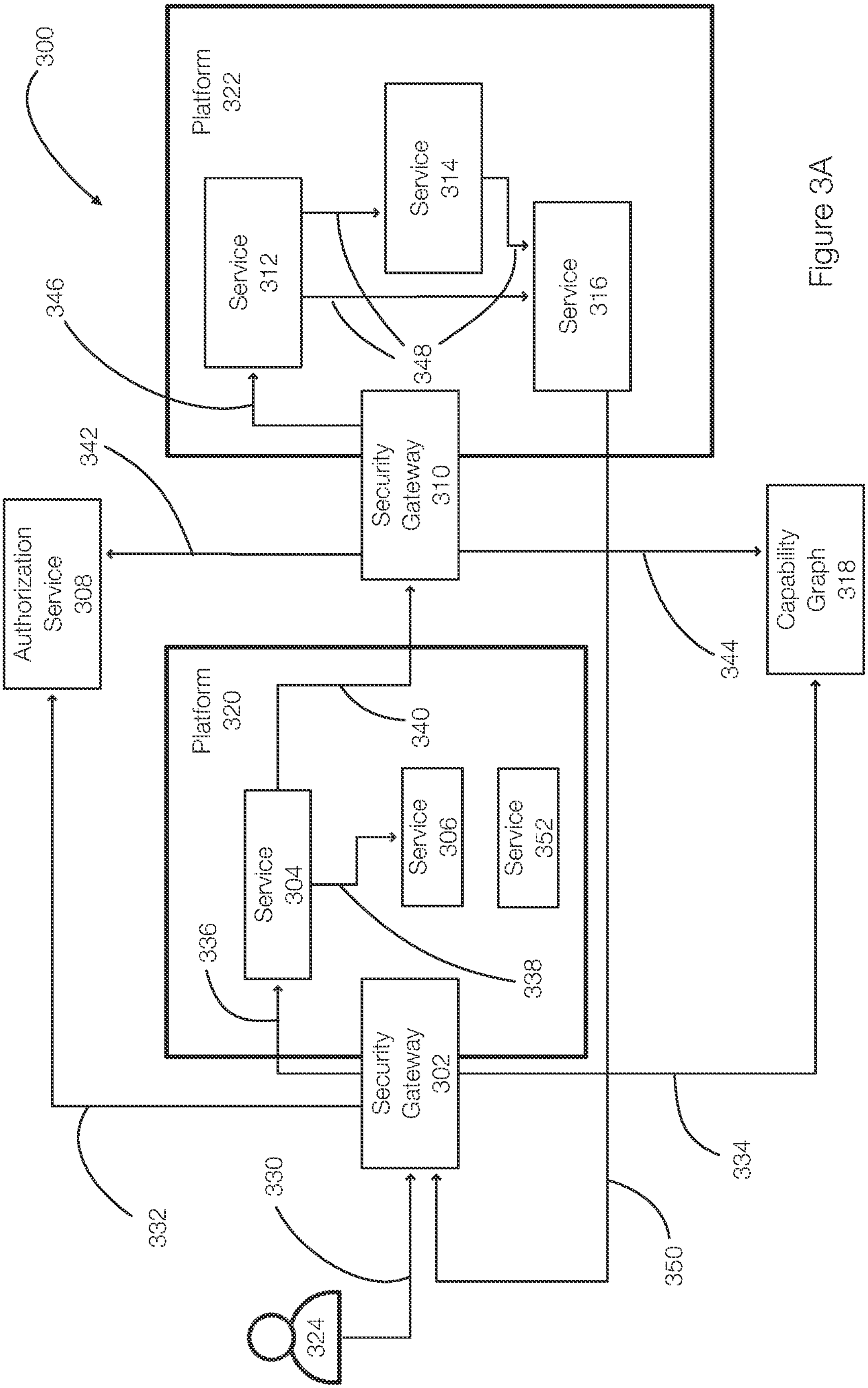
FIG. 3A discloses aspects of cryptographic context or a security context scopes a request for services or other resources.

FIG. 3A discloses aspects of performing a workflow that includes or is associated with a security context configured to scope or define the actions permitted in the workflow. FIG. 3A generally illustrates an environment 300 in which a workflow may be executed. The environment 300 may include edge systems, cloud systems, on-premise systems, platforms, services, or the like or combinations thereof, each including or associated with computing hardware including processors, memory, networking hardware, and the like.

In this example, the environment 300 includes a platform 320 and a platform 322, which may be independent of each other (e.g., third-party services). Each of the platforms 320 and 322 may include or provide various services that are available for a workflow. In FIG. 3A, a requestor 324 (e.g., a user, a client (a device), an application) makes or generates 330 a request that may be received at a security gateway 302 of the platform 320. The request is representative of a workflow and of a job or instance of the workflow that may be executed.

The security gateway 320 may validate 332 the request with an authorization service 308. For example, the authorization service 308 may perform a subject-user-resource authorization to determine whether the user is authorized or has the necessary authorizations. For example, this may include determining the aggregate authorizations that may be required by the workflow and ensuring that the requestor has the necessary authorizations regardless of the actual workflow path during execution.

Using the request from the requestor 324, the security gateway 302 may consult 334 a capability graph 318. In this example, the capability graph 318 may include data that may describe aspects of the services provided by the platform 320. For example, a directed acyclic graph may describe relationships between the services or between the methods of a service. The capability graph 318 may also include information that is based on workflows. The capability graph 318, for example, may specify that the service 304 may call the service 306 and/or the platform 322 or specify which services can be used by which workflows.

For example, if the request from the requestor 324 is initially directed to the service 304, the security context added to or associated with the workflow may specify a path within the platform 320 that the requestor (or workflow) is allowed to access or follow. In this example, after consulting the capability graph 318, the security context may be configured to scope the request to the service 304, 306, and platform 322. This is true even if the requestor 324 would otherwise be authorized to use the service 352. The security context thus scopes the work or the request based on the capability graph 318 and/or the workflow (e.g., using the work ID) or the like.

Services in the platform 320, or other locked-down environment, proceed when the security context is successfully verified. Successfully verifying the security context, which may be a token, may include verifying the token signature, verifying that the service is within the invocation path (e.g., using the information in the header such as the origin service), and verifying that the requestor has the right to perform the action on the specified resource.

In this example, depending on the workflow and after the security context is issued and associated with the workflow, the only actions the workflow is able to perform within the platform 320, in one example, are those specified in or allowed by the security context. Thus, the workflow may flow 338 from the service 304 to the service 306 and/or flow 340 from the service 304 to the security gateway 310 of the platform 322. The security context may prevent the request from using or accessing the service 352 even if the requestor 324 is otherwise authorized.

If the workflow proceeds to the security gateway 310 of the platform 322, another or new security context may be generated. Alternatively, the security context may account for all potential paths for the entire workflow for all platforms when created. The security gateway 310 may verify or validate 342 the requestor 324 using the authorization service 308 and access 344 the capability graph 318 in order to generate a security context. Once the security context for the platform 322 is generated, the requestor 324 may use the services 312, 314, and/or 316 in accordance with the security context. In this example, a first allowed path includes a path from service 312 to the service 316. As second allowed path is a path from the service 312 to the service 314, to the service 316. In this example, the service 316 may return the request or workflow back to the security gateway 302.

More specifically, the original requestor 324, which may be a user, an application, or the like, generates a request and a security context is generated and used to access the service 304 on the platform 320. The security context, which was used in the security gateway 302, is also used to access service 312 in the platform 322. However, the request is intercepted or processed by the security gateway 310. The security gateway 310 consults the capability graph 318 to verify that the platform 322 is in the execution path of the original request. At this point, a new security context may be issued with the option of chaining the original security context within the second security context. This may preserve auditability.

The security context thus allows a service in one platform to invoke a service in another distinct platform and/or invoke a downstream service in the same platform. Further, each platform and/or each service may decide whether or not to allow the request.

FIG. 3B illustrates an example of a security context. The security context 360 may be generated, in one example, by the security gateway 310 or by the authorization service 308. In this example, the services 312, 314, and 316 correspond to A, B, and C respectively in the security context 360. The security context 360 thus provides a work or security context that identifies, in this example, valid paths for the workflow within the platform 322. Thus, the request must access the service 312 (A) first. An attempt to access, for example, services C, B, and A, in that order, would not be permitted by the security context 360.

The security context 360 is distinct from role based or attribute based permissions, tokens, or authentication. The security context 360 scopes the request to the platform or environment. The security context 360 is not limited to paths within a platform. The security context can be configured to scope the workflow.

The security context 360 is further related to a specific instance, identified by the worked in one example.

Figure 4:
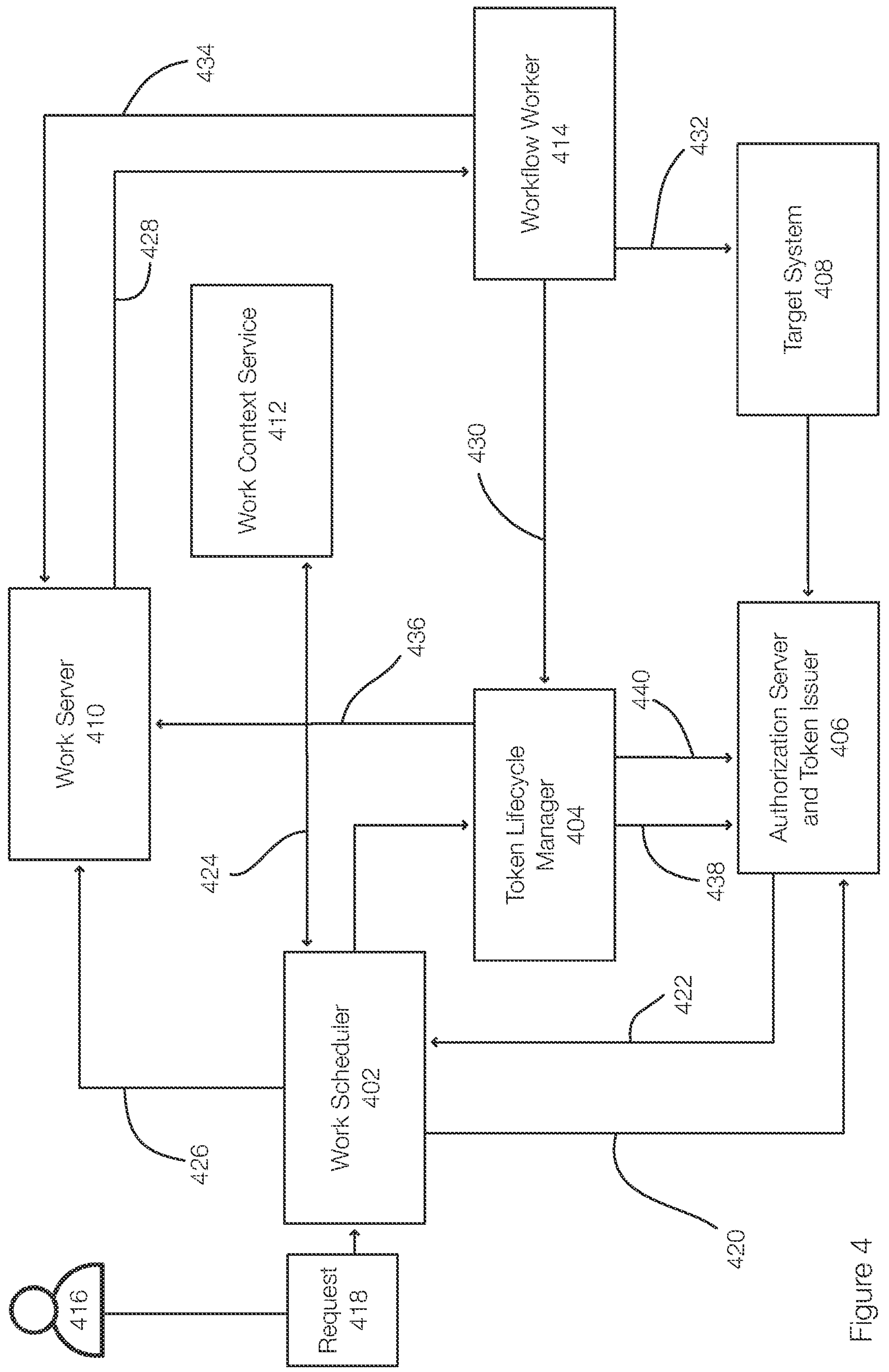
FIG. 4 discloses additional aspects of a security context in a computing environment configured to execute workflows.

FIG. 4 discloses aspects of linking an access token to a security context or to a capacity based security context of a workflow and illustrates aspects of performing work or a workflow using a security context. More specifically, FIG. 4 discloses aspects of linking a third party token (e.g., an access token) to a security context.

FIG. 4 illustrates a work scheduler 402. The work scheduler 402 is configured to ensure that the requestor 416 is authorized to request the work to be performed. The work scheduler 402 may obtain an access token that is bound to the request 418 (the work to be performed) and creates the work in the work server 410. The work context service 412 may issue a verifiable cryptographic security context for the specific instance of work that the requestor 416 has requested. The security context may be attached to or associated with the work and allows the services to determine whether or not to perform the work. A token lifestyle manager 404 may cooperate with the work server 410 to proactively confirm that a specific work associated with the request 418 is on-going. This allows expirations and timeouts to be tracked to ensure that the relevant token (e.g., the access token and or the security context) is kept alive, for example using refresh token calls to the authorization server 406. The token lifecycle manager 404 may also perform cleanup operations to destroy all security tokens and/or revoking tokens at the authorization server 406. The lifecycle manager 404 may also provide secure access to the token to only the client that is specifically working on the instance of work identified in the token.

The authorization server 406 may issue cryptographic tokens for API authorization of a target service and allows for dynamic scope binding to each instance of work identified by the work scheduler 402.

In FIG. 4, more specifically, a requestor 416 may send a request 418, which is received by a work scheduler 402. The work scheduler 402 may authorize 420 the requestor 416 using an authorization server 406. In one example, the ability of the requestor 416 to perform the workflow is verified up front by assessing the authorizations of the requestor 416 against all possible authorizations that may be required during execution of the workflow.

The authorization server 406 may issue 422 a token that is cryptographically scoped to the request 418 (i.e., the work) and to a work ID. In other words, the token issued by the authorization server 406 is bound to the request 418 or work submitted by the requestor 416.

Next, the work scheduler 402 may request 424 a security context for the specific instance of the request 418 from the work context service 412. The work context service 412 may issue a verifiable cryptographic security context (e.g., a security context). The token lifecycle manager 404 starts lifecycle management for the security context and/or the access token, which tokens may be combined.

More specifically, the work scheduler 402 may generate a work identifier (or potential identifier) and redirects to the authorization server 406. The work scheduler 402 also provides an additional claim of work to be included in the authentication token if the verification is successful. The work scheduler 402 then asks the work context service 412 to issue a cryptographic security context containing the work identifier previously generated. This allows the token issued by the authorization server 406 to be correlated with the security context issued by the work context service 412.

The work scheduler 402 then schedules 426 the work with a work server 410. The work includes or is associated with the security context issued by the work context service 412. The work server 410 may distribute 428 the work to a workflow worker 414. The worker 414 may obtain the security context and/or access token (which may be combined into a single token) from the manager 404. The worker 414 may then invoke an API at a target system 408. The target system 408 may verify the access token with the authorization server 406.

The target system 408 or target API can then determine whether to allow the work to proceed based on the authorization token and/or the security context. For example, the security context may be used to ensure that the requestor 416 is authorized with the authorization server 406. The security context, which may be verified by the manager 404 allows the target system 408 to verify the request 418 or the work in the context of the scope of the work authorized in the security context. For example, the target system 408 may be able to determine whether services of the target system 408 are needed for the request and whether the requested service is in the call path of the request 418. Each service at the target system 408 (or at other systems) can independently authorize an incoming request based on the scope of the work requested.

Rather than make an authorization decision based on simply whether the requestor 416 is authorized to perform an action, embodiments of the invention allow the authorization decision to be based on whether the requestor 416 is authorized to perform an action at the current time and in the context of the current workflow or work instance.

As the worker 414 performs the work or request 148, the worker may provide 434 updates or a progress status to the work server 410. The work server 410 may also obtain 436 a status of the workflow from the manager 404. If the work is ongoing, the manager 404 may refresh access 438 at the authorization server 406. If the work was terminated, the token or tokens are destroyed and the token is revoked 440.

Embodiments of the invention determine the authorization requirements of a workflow definition via a static analysis in one example and in an automated manner. With a security context, each service can independently authorize an incoming API based on the scope of the work. In effect, the security context can determine why a service API was called and whether the service is in the call path of the requested work. Rather than a conventional who can do what approach, the security context improves security by determining who can do what when in one example. Embodiments of the invention provide a capability-based security context.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. For example, any element(s) of any embodiment may be combined with any element(s) of any other embodiment, to define still further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect(s) or solution(s). Finally, it is not required that any embodiment implement any of the advantageous and unexpected effects disclosed herein.

It is noted that embodiments of the invention, whether claimed or not, cannot be performed, practically or otherwise, in the mind of a human. Accordingly, nothing herein should be construed as teaching or suggesting that any aspect of any embodiment of the invention could or would be performed, practically or otherwise, in the mind of a human. Further, and unless explicitly indicated otherwise herein, the disclosed methods, processes, and operations, are contemplated as being implemented by computing systems that may comprise hardware and/or software. That is, such methods, processes, and operations, are defined as being computer-implemented.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, data protection operations which may include, but are not limited to, workflow operations, token related operations, scoping operations, security context operations, authorization operations, or the like. More generally, the scope of the invention embraces any operating environment in which the disclosed concepts may be useful.

At least some embodiments of the invention provide for the implementation of the disclosed functionality in existing backup platforms, examples of which include the Dell-EMC NetWorker and Avamar platforms and associated backup software, and storage environments such as the Dell-EMC DataDomain storage environment. In general, however, the scope of the invention is not limited to any particular data backup platform or data storage environment.

New and/or modified data collected and/or generated in connection with some embodiments, may be stored in a data protection environment that may take the form of a public or private cloud storage environment, an on-premises storage environment, and hybrid storage environments that include public and private elements. Any of these example storage environments, may be partly, or completely, virtualized. The storage environment may comprise, or consist of, a datacenter which is operable to service read, write, delete, backup, restore, and/or cloning, operations initiated by one or more clients or other elements of the operating environment. Where a backup comprises groups of data with different respective characteristics, that data may be allocated, and stored, to different respective targets in the storage environment, where the targets each correspond to a data group having one or more particular characteristics.

Example cloud computing environments, which may or may not be public, include storage environments that may provide data protection functionality for one or more clients. Another example of a cloud computing environment is one in which processing, data protection, and other services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers, or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, files of any type including media files, word processing files, spreadsheet files, and database files, as well as contacts, directories, sub-directories, volumes, and any group of one or more of the foregoing.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

As used herein, the term 'backup' is intended to be broad in scope. As such, example backups in connection with which embodiments of the invention may be employed include, but are not limited to, full backups, partial backups, clones, snapshots, and incremental or differential backups.

It is noted that any operation(s) of any of the methods discloses herein, may be performed in response to, as a result of, and/or, based upon, the performance of any preceding operation(s). Correspondingly, performance of one or more operations, for example, may be a predicate or trigger to subsequent performance of one or more additional operations. Thus, for example, the various operations that may make up a method may be linked together or otherwise associated with each other by way of relations such as the examples just noted. Finally, and while it is not required, the individual operations that make up the various example methods disclosed herein are, in some embodiments, performed in the specific sequence recited in those examples. In other embodiments, the individual operations that make up a disclosed method may be performed in a sequence other than the specific sequence recited.

Following are some further example embodiments of the invention. These are presented only by way of example and are not intended to limit the scope of the invention in any way.

Embodiment 1. A method, comprising: receiving a request to perform a workflow from a requestor, determining whether the requestor has authorizations required to perform an instance of the workflow, generating an access token that is associated with the instance of the workflow, generating a security context for the instance of the workflow, wherein the security context places limits on the instance of the workflow, and executing the workflow, wherein each service accessed during execution of the instance of the workflow determines whether to perform services based on the access token and the security context.

Embodiment 2. The method of embodiment 1, further comprising scanning a workflow definition of the workflow to identify maximum authorizations associated with the workflow and storing the maximum authorizations in a database.

Embodiment 3. The method of embodiment 1 and/or 2, further comprising comparing the authorizations of the requestor to the maximum authorizations to determine whether the requester is able to execute the workflow, wherein the requestor is able to execute the workflow when the authorizations of the user includes the maximum authorizations.

Embodiment 4. The method of embodiment 1, 2, and/or 3, wherein the security context is configured to limit a type of work requested or scope a capacity of the work or define a path of the work.

Embodiment 5. The method of embodiment 1, 2, 3, and/or 4, wherein the security context is valid only to work uniquely identified in the security context.

Embodiment 6. The method of embodiment 1, 2, 3, 4, and/or 5, wherein the security context identifies service/workflow/call paths that the request is allowed to be processed through.

Embodiment 7. The method of embodiment 1, 2, 3, 4, 5, and/or 6, further comprising managing a lifecycle of the access token and the security context.

Embodiment 8. The method of embodiment 1, 2, 3, 4, 5, 6, and/or 7, further comprising revoking the access token and/or the security context when the instance finishes.

Embodiment 9. The method of embodiment 1, 2, 3, 4, 5, 6, 7, and/or 8, wherein the security context is bound to the instance of the workflow.

Embodiment 10. The method of embodiment 1, 2, 3, 4, 5, 6, 7, 8, and/or 9, wherein the security context places the limits on the instance even when the requestor is otherwise authorized.

Embodiment 11 A system, comprising hardware and/or software, operable to perform any of the operations, methods, or processes, or any portion of any of these, disclosed herein.

Embodiment 12 A non-transitory storage medium having stored therein instructions that are executable by one or more hardware processors to perform operations comprising the operations of any one or more of embodiments 1-10.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term module, component, engine, client, service, agent, or the like, may refer to software objects or routines that execute on the computing system. These may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 5:
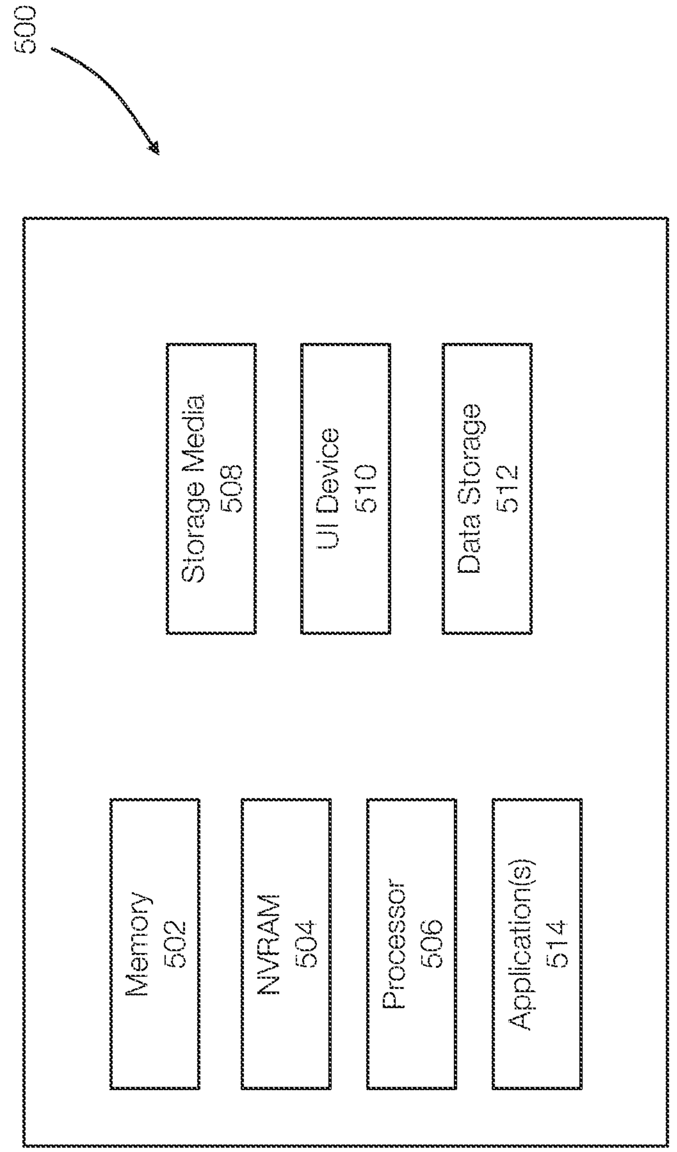
FIG. 5 discloses aspects of a computing device, system, or entity.

With reference briefly now to FIG. 5, any one or more of the entities disclosed, or implied, by the Figures and/or elsewhere herein, may take the form of, or include, or be implemented on, or hosted by, a physical computing device, one example of which is denoted at 500. As well, where any of the aforementioned elements comprise or consist of a virtual machine (VM), that VM may constitute a virtualization of any combination of the physical components disclosed in FIG. 5.

In the example of FIG. 5, the physical computing device 500 includes a memory 502 which may include one, some, or all, of random access memory (RAM), non-volatile memory (NVM) 504 such as NVRAM for example, read-only memory (ROM), and persistent memory, one or more hardware processors 506, non-transitory storage media 508, UI device 510, and data storage 512. One or more of the memory components 502 of the physical computing device 500 may take the form of solid state device (SSD) storage. As well, one or more applications 514 may be provided that comprise instructions executable by one or more hardware processors 506 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving a request to perform a workflow from a requestor;

scanning a workflow definition of the workflow to identify maximum authorizations associated with the workflow, wherein the maximum authorizations include all authorizations required to execute the workflow and any child workflow, which is a child of the workflow;

determining, prior to initiating execution of an instance of the workflow, whether the requestor has the maximum authorizations required to perform the instance of the workflow;

generating an access token that is associated with the instance of the workflow only after determining that the requestor has the maximum authorizations required to perform the instance of the workflow, wherein the access token is configured for token-based authentication, and wherein the access token informs services used by the instance of the workflow that the requestor is authorized to access the services;

generating a security context for the instance of the workflow, wherein the security context places limits on the instance of the workflow by defining a permitted service, wherein the security context is configured to limit a type of work requested for the instance of the workflow, scope a capacity of the work requested for the instance of the workflow, or define a call path of the instance of the workflow, and wherein the security context is bound to the instance of the workflow; and performing the execution of the instance of the workflow in a computing environment, wherein each service accessed during the execution of the instance of the workflow determines whether to perform services based on the access token and the security context, including verifying that a requested service is within the permitted service, the workflow, or call path defined by the security context prior to performing the requested service, and wherein the security context places the limits on the instance of the workflow even when the requestor is otherwise authorized.

2. The method of claim 1, further comprising storing the maximum authorizations in a database.

3. The method of claim 2, further comprising comparing authorizations of the requestor to the maximum authorizations to determine whether the requestor is able to execute the workflow, wherein the requestor is able to execute the workflow when the authorizations of the requestor include the maximum authorizations.

4. The method of claim 1, wherein the security context is valid only for work uniquely identified in the security context.

5. The method of claim 1, further comprising managing a lifecycle of the access token and the security context.

6. The method of claim 5, further comprising revoking the access token and/or the security context when the instance of the workflow finishes.

7. A non-transitory storage medium having stored therein instructions that are executable by one or more hardware processors to perform operations comprising:

receiving a request to perform a workflow from a requestor;

scanning a workflow definition of the workflow to identify maximum authorizations associated with the workflow, wherein the maximum authorizations include all authorizations required to execute the workflow and any child workflow, which is a child of the workflow;

determining, prior to initiating execution of an instance of the workflow, whether the requestor has the maximum authorizations required to perform the instance of the workflow;

generating an access token that is associated with the instance of the workflow only after determining that the requestor has the maximum authorizations required to perform the instance of the workflow, wherein the access token is configured for token-based authentication, and wherein the access token informs services used by the instance of the workflow that the requestor is authorized to access the services;

generating a security context for the instance of the workflow, wherein the security context places limits on the instance of the workflow by defining a permitted service, wherein the security context is configured to limit a type of work requested for the instance of the workflow, scope a capacity of the work requested for the instance of the workflow, or define a path of the instance of the workflow, and wherein the security context is bound to the instance of the workflow; and performing the execution of the instance of the workflow in a computing environment, wherein each service accessed during the execution of the instance of the workflow determines whether to perform services based on the access token and the security context, including verifying that a requested service is within the permitted service, the workflow, or call path defined by the security context prior to performing the requested service, and wherein the security context places the limits on the instance of the workflow even when the requestor is otherwise authorized.

8. The non-transitory storage medium of claim 7, further comprising storing the maximum authorizations in a database.

9. The non-transitory storage medium of claim 8, further comprising comparing authorizations of the requestor to the maximum authorizations to determine whether the requestor is able to execute the workflow, wherein the requestor is able to execute the workflow when the authorizations of the requestor include the maximum authorizations.

10. The non-transitory storage medium of claim 7, wherein the security context is valid only for work uniquely identified in the security context.

11. The non-transitory storage medium of claim 7, further comprising managing a lifecycle of the access token and the security context.

12. The non-transitory storage medium of claim 11, further comprising revoking the access token and/or the security context when the instance of the workflow finishes.

* * * * *